US008306318B2

(12) United States Patent
Cao et al.

(10) Patent No.: US 8,306,318 B2
(45) Date of Patent: Nov. 6, 2012

(54) IMAGE PROCESSING APPARATUS, IMAGE PROCESSING METHOD, AND COMPUTER READABLE STORAGE MEDIUM

(75) Inventors: Hui Cao, Nagoya (JP); Takashi Naito, Tajimi (JP)

(73) Assignee: Kabushiki Kaisha Toyota Chuo Kenkyusho, Aichi-Gun (JP)

(*) Notice: Subject to any disclaimer, the term of this patent is extended or adjusted under 35 U.S.C. 154(b) by 318 days.

(21) Appl. No.: 12/858,705

(22) Filed: Aug. 18, 2010

(65) Prior Publication Data
US 2011/0052050 A1 Mar. 3, 2011

(30) Foreign Application Priority Data
Sep. 2, 2009 (JP) ................ 2009-202806

(51) Int. Cl.
*G06K 9/00* (2006.01)
(52) U.S. Cl. ........................ 382/162; 382/103
(58) Field of Classification Search .............. 382/103, 382/162, 165, 168, 170, 159, 190, 195, 224; 348/169–179
See application file for complete search history.

(56) References Cited

U.S. PATENT DOCUMENTS

| | | | |
|---|---|---|---|
| 6,173,066 B1* | 1/2001 | Peurach et al. | 382/103 |
| 7,574,018 B2* | 8/2009 | Luo | 382/103 |
| 7,831,094 B2* | 11/2010 | Gupta et al. | 382/190 |
| 7,889,886 B2* | 2/2011 | Matsugu et al. | 382/103 |
| 8,144,932 B2* | 3/2012 | Okada et al. | 382/103 |
| 2005/0196047 A1* | 9/2005 | Owechko et al. | 382/224 |
| 2010/0008540 A1* | 1/2010 | Shet et al. | 382/103 |
| 2010/0034465 A1 | 2/2010 | Watanabe et al. | |
| 2010/0111416 A1* | 5/2010 | Meiers | 382/170 |
| 2010/0272366 A1* | 10/2010 | Meng et al. | 382/190 |

FOREIGN PATENT DOCUMENTS

| | | |
|---|---|---|
| JP | A-2007-156626 | 6/2007 |
| JP | A-2009-301104 | 12/2009 |
| JP | A-2010-44439 | 2/2010 |

* cited by examiner

*Primary Examiner* — Ishrat I Sherali
(74) *Attorney, Agent, or Firm* — Oliff & Berridge, PLC

(57) ABSTRACT

A feature vector computation section 24 of an image processing apparatus computes a feature vector expressing gradient histograms for each of plural child regions that have been further partitioned from plural parent regions partitioned from a discrimination-subject image. A feature relative vector computation section 26 of the image processing apparatus computes for each parent region a feature relative vector expressing relative values computed from respective combinations of the same or different elements across feature vectors computed for each child region, and relative values computed from respective combinations of the same or different elements within one of the feature vectors. A discrimination section 30 of the image processing apparatus, based on the feature relative vector computed for each parent region, discriminates whether or not the image subject to processing is an image in which a processing target object appears.

13 Claims, 12 Drawing Sheets

WINDOW IMAGE        PARENT REGIONS

PARENT REGIONS      CHILD REGIONS

WINDOW IMAGE

PARENT REGION
PARTITIONS

CHILD REGION
PARTITIONS

GRADIENT HISTOGRAM

GRADIENT HISTOGRAM OF CHILD REGION

FIG.9A $$\begin{bmatrix} 0.6 \\ 0.1 \\ 0.0 \\ 0.1 \\ \vdots \end{bmatrix}$$

FEATURE RELATIVE
VECTOR OF
PARENT REGION

FIG.9B $$B1\left\{\begin{bmatrix} 0.1 \\ 0.4 \\ 0.3 \\ 0.0 \\ \vdots \end{bmatrix}\right.$$
$$B2\left\{\begin{matrix} 0.1 \\ 0.6 \\ 0.1 \\ 0.0 \\ 0.1 \\ \vdots \\ 0.3 \\ \vdots \end{matrix}\right.$$

FEATURE RELATIVE
DESCRIPTOR

IMAGE PROCESSING APPARATUS, IMAGE PROCESSING METHOD, AND COMPUTER READABLE STORAGE MEDIUM

CROSS-REFERENCE TO RELATED APPLICATION

This application claims priority under 35 USC 119 from Japanese Patent Application No. 2009-202806 filed Sep. 2, 2009.

BACKGROUND

1. Technical Field

The present invention relates to an image processing apparatus, image processing method, and a computer readable storage medium, and in particular to an image forming apparatus, image processing method, and a computer readable storage medium for discriminating whether or not an image subject to processing is an image in which a processing target object is captured, or detecting a region in which a processing target object appears.

2. Related Art

Up until now, Histogram of Oriented Gradients (HOG) features are being widely employed in the field of object recognition (see Japanese Patent Application Laid-Open (JP-A) No. 2007-156626). HOG features are feature amounts arising from partitioning an image into plural regions and constructing a histogram of the gradient orientations of brightness in each of the regions. Since HOG features are extracted for each localized region, there is little influence from changes in illumination, and the Histograms of Oriented Gradients are robust to localized small geometric variations.

However, the HOG features described above are only able to express localized object shapes in a broad manner, and, since it is difficult to express high-order features included in object shapes, such as co-occurrences of adjacent outlines, there is the problem that image discrimination at high precession cannot be made.

SUMMARY

The present invention has been made in view of the above circumstances. An image processing apparatus according to the present invention includes: a feature vector computation unit that computes a feature vector with elements of a physical quantity against respective different feature amounts, for each of plural partitioned regions partitioned from an image subject to processing; a feature relative vector computation unit that computes a feature relative vector expressing computation values computed from respective combinations of the same or different elements across feature vectors computed by the feature vector computation unit for each partitioned region, and computation values computed from respective combinations of different elements within one of the feature vectors; and an image processing unit that, based on the feature relative vector computed by the feature relative vector computation unit, discriminates whether or not the image subject to processing is an image in which a processing target object appears, or detects a region from the image subject to processing in which the processing target object appears.

According to the present invention, using the feature vector computation unit, the feature vector is computed with elements of the physical quantity against respective different feature amounts, for each of plural partitioned regions partitioned from the image subject to processing. Using the feature relative vector computation unit, the feature relative vector is computed expressing computation values computed from respective combinations of the same or different elements across feature vectors computed by the feature vector computation unit for each partitioned region, and computation values computed from respective combinations of different elements within one of the feature vectors.

Using the image processing unit, based on the feature relative vector computed by the feature relative vector computation unit, discrimination is made as to whether or not the image subject to processing is an image in which the processing target object appears, or detection is made of a region from the image subject to processing in which the processing target object appears.

By thus employing the feature relative vector expressing computation values computed from respective combinations of elements across feature vectors or within one feature vector for each of the partitioned regions, high precision discrimination can be made as to whether or not the image subject to processing is an image in which the processing target object appears, or a region in which the processing target object appears can be detected with high precision.

The feature vector computation unit according to the present invention may compute the feature vector for each of plural child regions partitioned from plural parent regions partitioned from the image subject to processing. The feature relative vector computation unit of the present invention may compute for each of the respective parent regions a feature relative vector expressing computation values computed from respective combinations of the same or different elements across feature vectors computed for each child region of the parent region by the feature vector computation unit, and computation values computed from respective combinations of different elements within one of the feature vectors. The image processing unit of the present invention, based on the feature relative vector computed for each of the parent regions by the feature relative vector computation unit, may discriminate whether or not the image subject to processing is an image in which the processing target object appears, or may detect a region from the image subject to processing in which the processing target object appears. Accordingly, high precision discrimination can be made as to whether or not the image subject to processing is an image in which the processing target object appears, or a region in which the processing target object appears can be detected with high precision.

The above feature vector computation unit may extract the feature amount for each pixel in the partitioned regions, and may compute as the feature vector a feature histogram with elements of occurrence frequency against different feature amounts for the partitioned regions.

The above feature vector computation unit may compute gradient orientation and gradient strength for each pixel in the partitioned regions, and may compute as the feature vector a Histogram of Oriented Gradients for each of the partitioned regions with elements of voted values for the of the gradient strength against respective different gradient orientations.

The feature relative vector computation unit described above may compute the minimum value or the harmonic mean value as the computation value of the combinations of elements.

A computer readable medium according to the present invention stores a program causing a computer to execute a process for image processing, wherein the process includes: computing a feature vector with elements of a physical quantity against respective different feature amounts, for each of a plurality of partitioned regions partitioned from an image subject to processing; computing a feature relative vector expressing computation values computed from respective combinations of the same or different elements across feature vectors computed for each partitioned region, and computation values computed from respective combinations of different elements within one of the feature vectors; and, based on the computed feature relative vector, discriminating whether or not the image subject to processing is an image in which a processing target object appears, or detecting a region from the image subject to processing in which the processing target object appears.

An image processing method according to the present invention includes: computing a feature vector with elements of a physical quantity against respective different feature amounts, for each of a plurality of partitioned regions partitioned from an image subject to processing; computing a feature relative vector expressing computation values computed from respective combinations of the same or different elements across feature vectors computed for each partitioned region, and computation values computed from respective combinations of different elements within one of the feature vectors; and, based on the computed feature relative vector, discriminating whether or not the image subject to processing is an image in which a processing target object appears, or detecting a region from the image subject to processing in which the processing target object appears.

BRIEF DESCRIPTION OF THE DRAWINGS

Exemplary embodiments of the present invention will be described in detail based on the following figures, wherein:

FIG. 9A is a diagram showing an example of a feature relative vector, and FIG. 9B is a diagram showing an example of a feature relative descriptor;

DETAILED DESCRIPTION

Detailed explanation follows below of an exemplary embodiment of the present exemplary embodiment, with reference to the drawings. Explanation follows of an example of the present invention applied to a target object discrimination apparatus that discriminates whether or not a captured image is an image captured of a pedestrian, serving as a discrimination target object.

Figure 1:
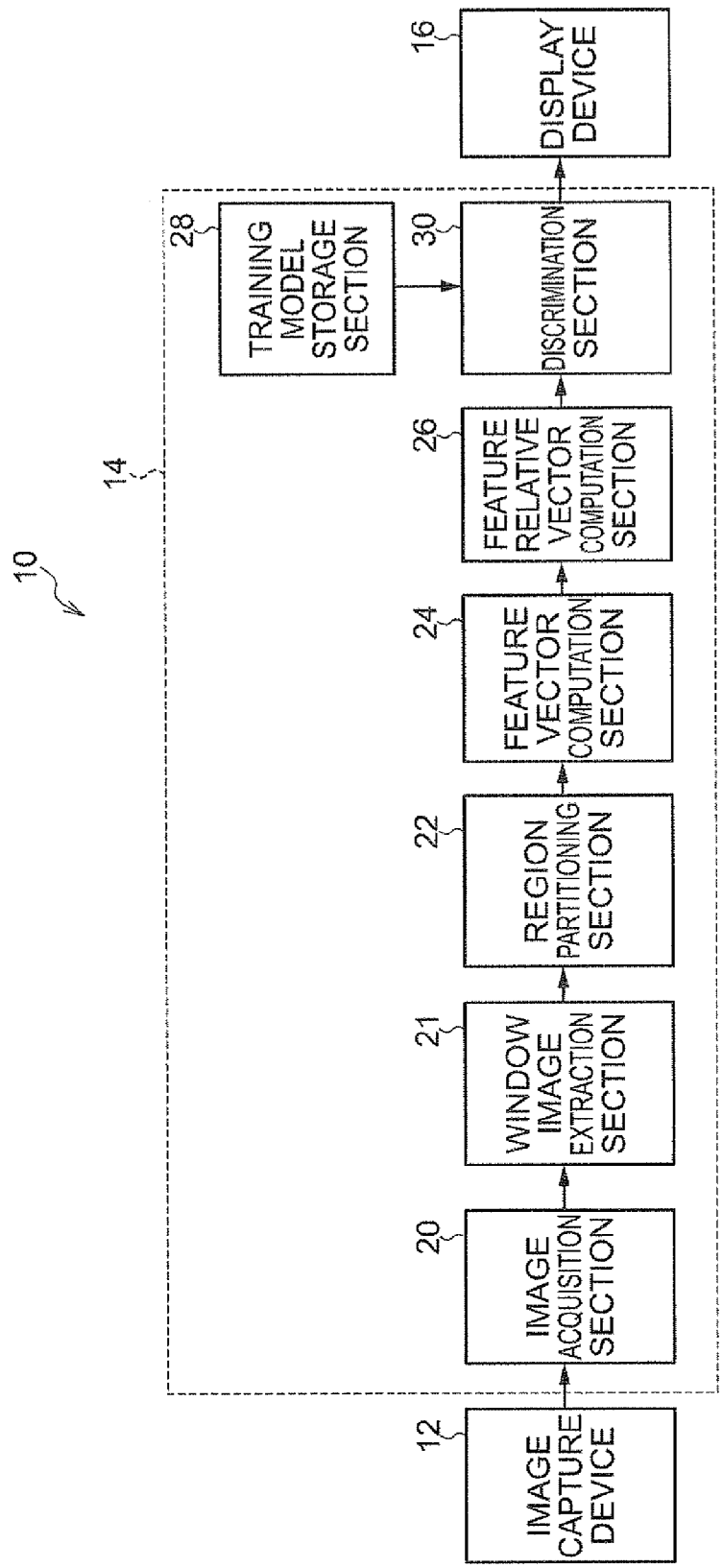
FIG. 1 is a schematic configuration diagram showing a configuration of a target object discrimination apparatus according to a first exemplary embodiment of the present invention.

As shown in FIG. 1, a target object discrimination apparatus 10 according to a first exemplary embodiment includes: an image capture device 12 that is mounted to a vehicle (not shown in the figures), and generates an image captured in the forward direction of the vehicle; a computer 14 that discriminates whether or not the captured image obtained from the image capture device 12 is an image in which a pedestrian is captured; and a display device 16 that displays the discrimination result of the computer 14.

The image capture device 12 includes an image capture section (not shown in the figures) that captures an image in the vehicle forward direction, and generates an image signal of the image, an A/D conversion section (not shown in the figures) that A/D converts the image signal generated by the image capture section, and an image memory (not shown in the figures) for temporarily storing the A/D converted image signal.

The computer 14 includes a CPU, RAM, and a ROM stored with a program for executing a discrimination processing routine, described below. The computer 14 is functionally configured as follows. The computer 14 includes: an image acquisition section 20 that acquires a captured image from the image capture device 12; a window image extraction section 21 that extracts plural window images from the captured image acquired by the image acquisition section 20, by scanning using clipping windows of various sizes; a region partitioning section 22 that partitions each of the extracted window images into plural parent regions, and further partitions each of the parent regions into plural child regions; a feature vector computation section 24 that computes a gradient histogram for each child region, and generates a feature vector expressing the gradient histogram; a feature relative vector computation section 26 that, for each of the parent regions, computes a feature relative vector, described below, based on the feature vectors of all of the respective child regions belonging to the particular parent region; a training model storage section 28 that stores a Support Vector Machine (SVM) model, serving as a training model generated in advance based on training images in which pedestrians are captured; and a discrimination section 30 that uses a SVM discriminator to discriminate as to whether or not the discrimination-subject window image is an image captured of a pedestrian based on the computed feature relative vector of each of the parent regions and the training model.

Figure 2:
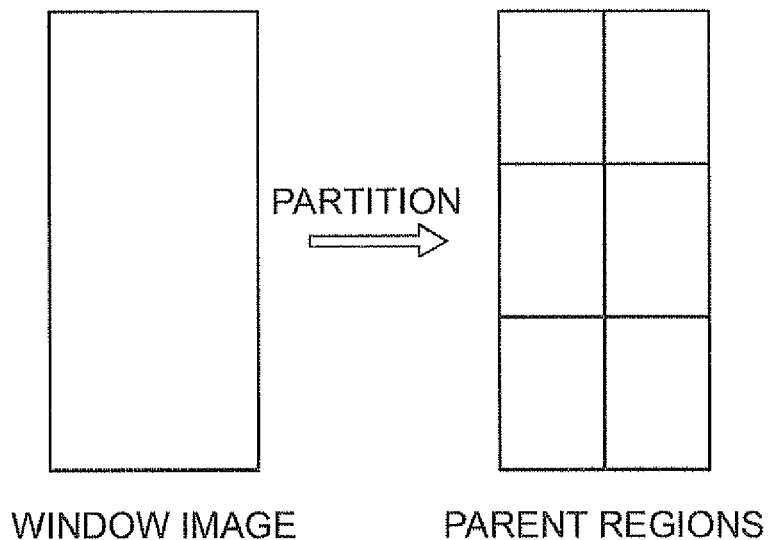
FIG. 2 is a diagram showing a way of partitioning into parent regions.
Figure 3:
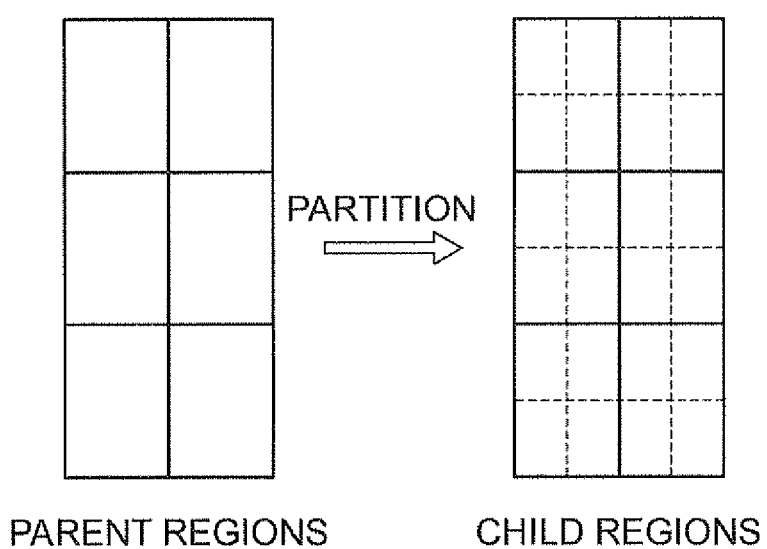
FIG. 3 is a diagram showing a way in which parent regions are partitioned into child regions.
Figure 4A:
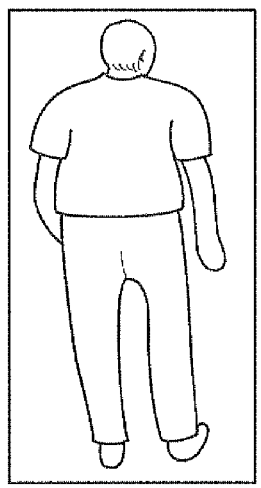
FIG. 4A is a diagram showing a window image.
Figure 4B:
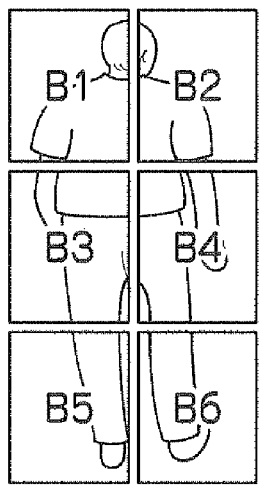
FIG. 4B is a diagram of a way of partitioning into parent regions.
Figure 4C:
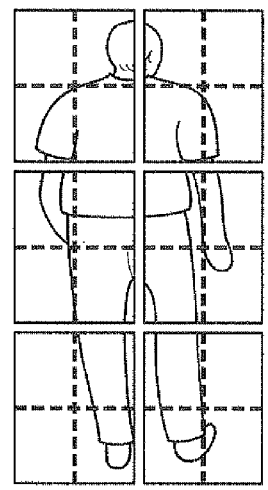
FIG. 4C is a diagram showing a way in which parent regions are partitioned into child regions.

The region partitioning section 22, as shown in FIG. 2, first equally partitions a window image obtained by the window image extraction section 21 into plural parent regions. The region partitioning section 22, as shown in FIG. 3, further partitions each of the respective partitioned parent regions into plural child regions smaller than the parent regions. For example, as shown in FIG. 4A and FIG. 4B, the window image is partitioned into six parent regions B1 to B6, and each of the parent regions B1 to B6 is further partitioned into four child regions, as shown in FIG. 4C.

Figure 5:
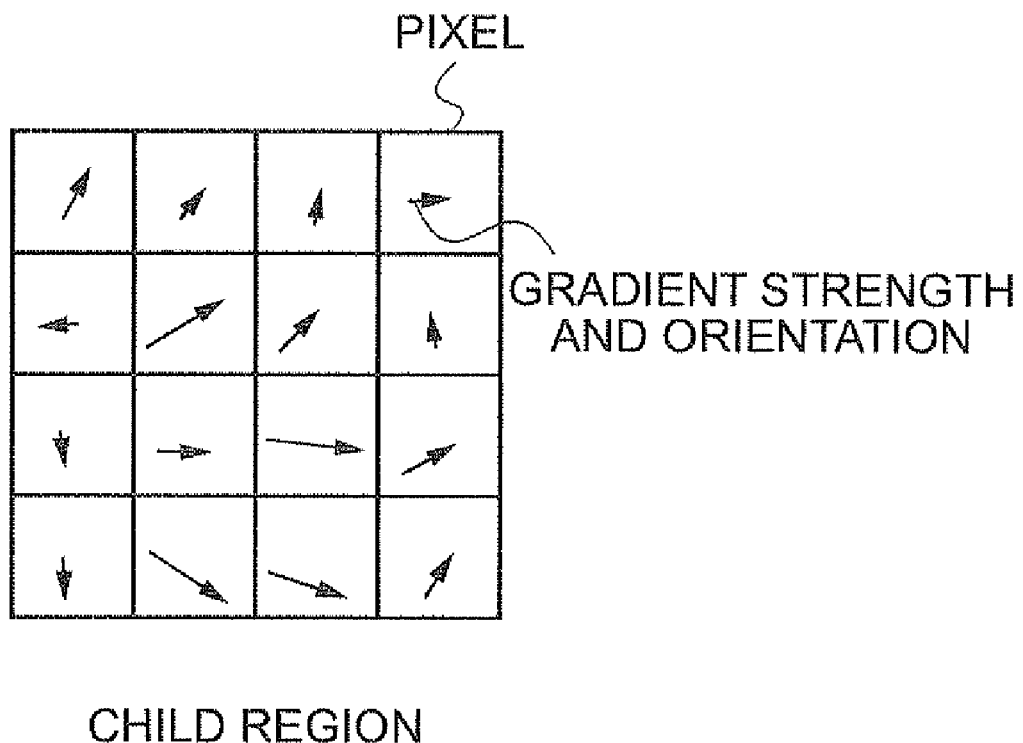
FIG. 5 is a diagram showing a way in which gradient strengths and orientation are computed for each pixel within a child region.

The feature vector computation section 24 first, as shown in FIG. 5, computes the gradient strength and the gradient orientation of each of the pixels for each of the partitioned child regions.

The gradient orientation m is computed according to the following Equation (1).

Equation (1)

$$m(x,y)=\sqrt{f_x(x,y)^2+f_y(x,y)^2}$$

$$f_x(x,y)=I(x+1,y)-I(x-1,y)$$

$$f_y(x,y)=I(x,y+1)-I(x,y-1) \quad (1)$$

Wherein m(x, y) represents the gradient strength at the pixel coordinate (x, y), I(x, y) represents the brightness value of the pixel coordinate (x, y).

The gradient strength here is, as shown in above Equation (1), derived based on the brightness difference of the surrounding pixels present at the peripheral edges of each pixel in question, and expresses the degree of change in the brightness in a specific region including the pixel in question and its surrounding pixels.

The gradient orientation θ is computed according to the following Equation (2).

Equation (2)

$$\theta(x, y) = \tan^{-1}\frac{f_y(x, y)}{f_x(x, y)} \quad (2)$$

Wherein, θ(x, y) expresses the gradient orientation at pixel coordinate (x, y).

Figure 6:
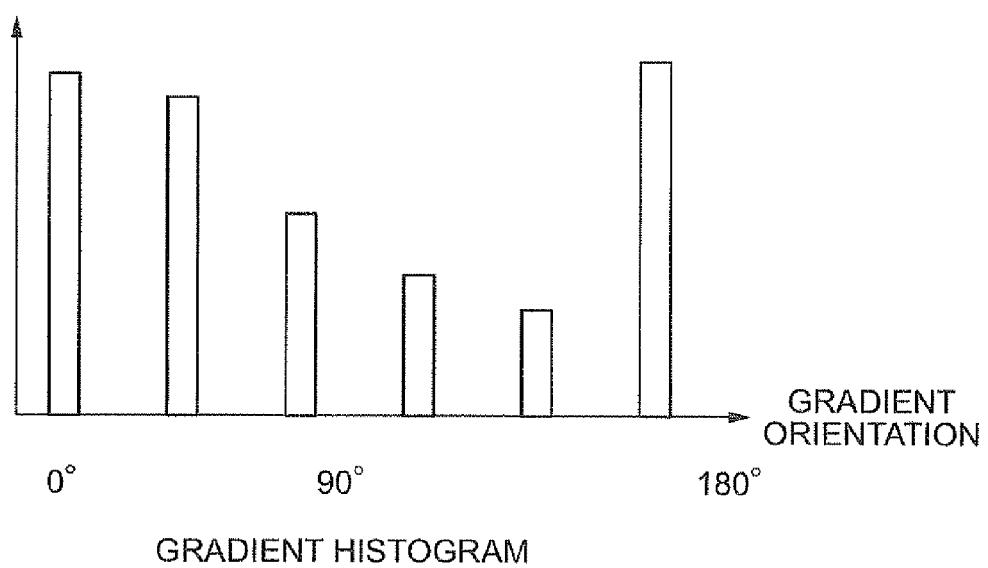
FIG. 6 is a graph showing a gradient histogram.

The feature vector computation section 24, as shown in FIG. 6, based on the computed gradient strength and gradient orientation for each pixel of a child region, computes a histogram of each gradient orientation for the child region in question (referred to below as gradient histogram). Specifically, either the range of 0 to 180° or the range of 0 to 360° is partitioned into bins of N degrees. For example, the range of 0 to 180° is partitioned into 30° bins, and a histogram of the six directions is computed. Note that during voting a gradient histogram, the gradient histogram is computed by voting the gradient strength held by each pixel into the gradient orientation (bin) that corresponds to the gradient orientation held by that pixel.

Figure 7:
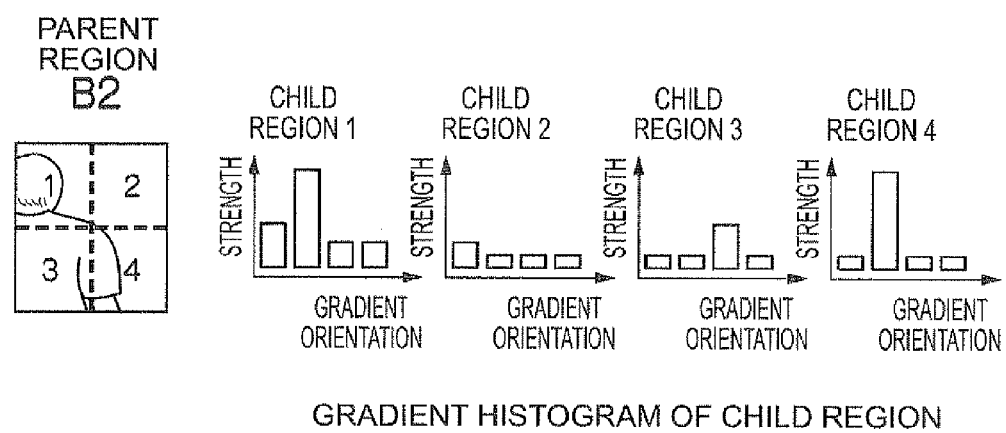
FIG. 7 are graphs showing a gradient histogram of each child region.

As described above, a gradient histogram is computed for each of the child regions belonging to a parent region and, as shown in FIG. 7, a feature vector expressing the gradient histogram for each of the child regions is generated. This processing to generate the feature vector of each of the child regions is performed for each of the parent regions, and, for each parent region, a feature vector is generated for each of the child regions belonging to the respective parent region.

Explanation follows regarding the principles of the present exemplary embodiment.

HOG features employed up until now could broadly express localized object shapes, however, it was difficult to express high order features included in the object shape, such as, for example, co-occurrence of adjacent outlines. In order to solve the above described deficiencies in existing descriptors, by utilizing high order image features in which co-occurrences of feature amounts (for example, outlines) between adjacent child regions are expressed, object shapes can better expressed.

Figure 8:
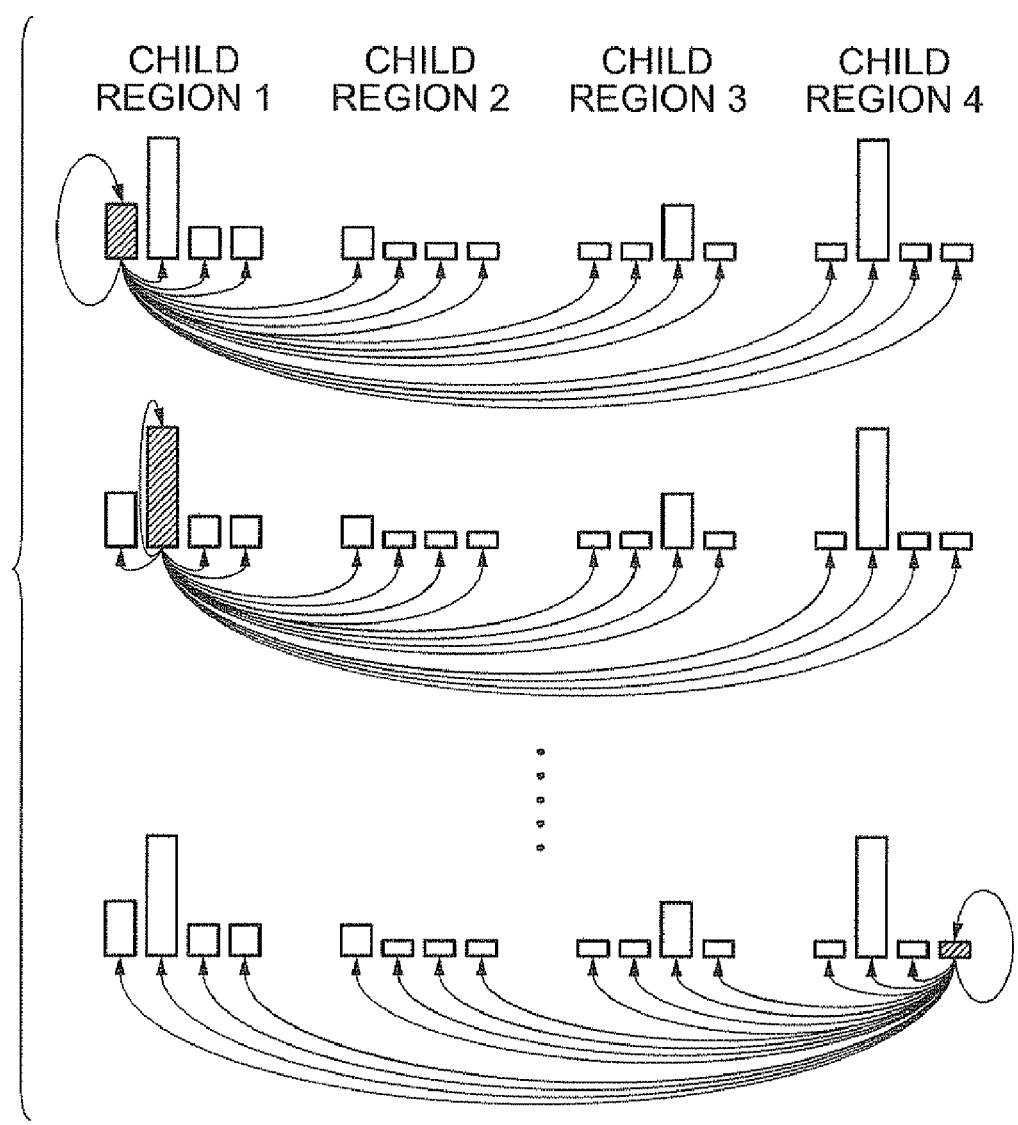
FIG. 8 is a diagram showing a way in which combinations are made of elements of feature vectors expressing gradient histograms.

Consequently, in the present exemplary embodiment, using the feature relative vector computation section 26, for each of the parent regions, as shown in FIG. 8, the computed feature vectors (histogram of orientated gradients) for all of the child regions belonging to the parent region in question are assembled, combinations (namely, combinations of elements of histograms of orientated gradients) are respectively made of all of the elements of all of the feature vectors, and relative values are computed for each of the combinations of elements. Regarding the combinations of elements, these include combinations of elements of the same element or different elements within the same feature vector, and combinations of the same element or different elements across different feature vectors.

There are many functions that can be selected for computing the relative values. For example, computation of the relative values may utilize the minimum value function min (x, y), or may use the harmonic mean function 2xy/(x+y). The feature relative vector computation section 26, as shown in FIG. 9A, arrays the computed relative values, and generates feature relative vectors in each of the parent regions. The feature relative vector computation section 26 finally normalizes the feature relative vectors obtained as described above.

In the present exemplary embodiment, as shown in FIG. 9B, the normalized arrayed and combined feature relative vectors for all of the parent regions, obtained as described above, is referred to as the feature relative descriptor for the image overall.

A training model derived in advance by the following training processing is stored in the training model storage section 28.

First, plural pedestrian images from extracting with a clipping window portions in which an image of a pedestrian is captured, and plural non-pedestrian images from extracting with a clipping window portions in which an image of a pedestrian is not captured, are prepared in advance. Then, the feature relative vectors are computed for each of the plural pedestrian image and the plural non-pedestrian images, and the respective feature relative descriptor of the image overall is derived for each image.

Then, using the derived feature relative descriptors for each of the images as training data, training processing is performed employing instructor labels applied according to whether each of the images is a pedestrian image or a non-pedestrian image, an SVM model is derived as a training model, and stored in the training model storage section 28.

The discrimination section 30 uses a known SVM discriminator and, based on the training model stored in the training model storage section 28 and the feature relative descriptor of the arrayed feature relative vectors computed by the feature relative vector computation section 26, discriminates whether or not the discrimination-subject window image is an image in which a pedestrian is captured. The discrimination section 30 displays the discrimination result on the display device 16.

Next, explanation follows regarding operation of the target object discrimination apparatus 10 according to the present exemplary embodiment. First, training processing is performed, based on the plural pedestrian images obtained by capturing images of a pedestrian, and the plural non-pedestrian images obtained by capturing images other than of pedestrians, and the SVM model obtained is stored in the training model storage section 28.

Figure 10:
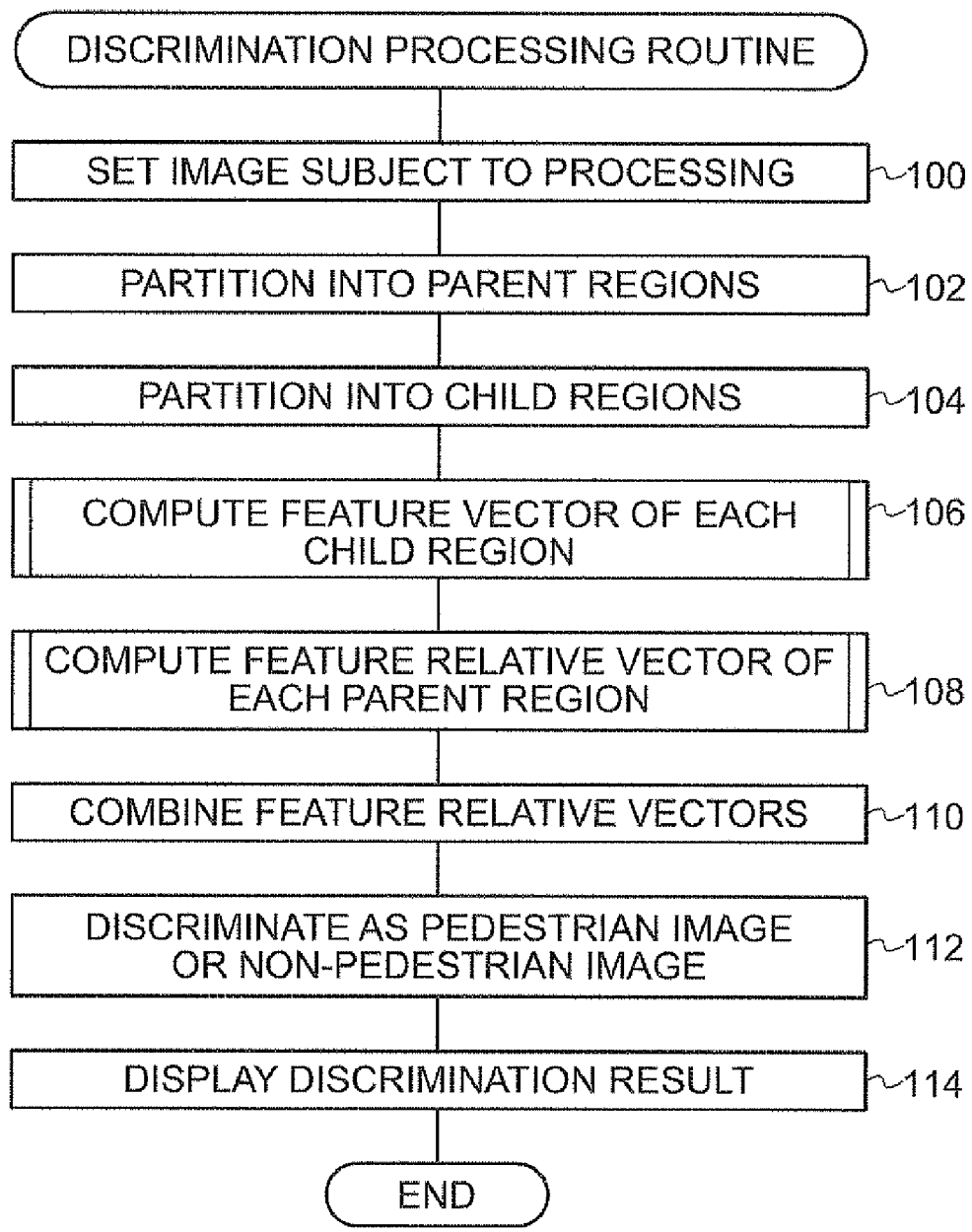
FIG. 10 is a flow chart showing the contents of a discrimination processing routine in a computer of a target object discrimination apparatus according to the first exemplary embodiment of the present invention.

With the target object discrimination apparatus 10 mounted to a traveling vehicle, when an image of a specific region in the vehicle forward direction is captured using the image capture device 12, the computer 14 acquires the captured image from the image capture device 12, and clipping is performed on the captured image by scanning over the captured image with clipping windows of various sizes. The discrimination processing routine shown in FIG. 10 is executed in the computer 14 for each of the respective window images clipped using the clipping windows.

First, at step 100, the window image that is to be the discrimination subject is set, then at step 102, the window image set as the discrimination subject in step 100 is partitioned equally into plural parent regions. Then, at step 140, the parent regions partitioned at step 102 are equally partitioned into child regions.

At the next step 106, a feature vector expressing a gradient histograms is computed for each of the child regions partitioned at step 104. Then, at step 108, a feature relative vector based on the feature vectors computed in step 106 is computed for each of the parent regions.

Then, at step 110, by arraying and combining the feature relative vectors computed for each of the parent regions at step 108, a feature relative descriptor is obtained for the image overall. At the next step 112, based on the feature relative descriptor obtained in step 110, discrimination is made, using the training model derived in advance and the SVM discriminator, as to whether or not the discrimination-subject window image is a pedestrian image in which a pedestrian appears. Then, at step 114, the discrimination result of step 112 is displayed on the display device 16, and the discrimination routine is ended. The discrimination routine described above is executed on each of the respective clipped window images.

Figure 11:
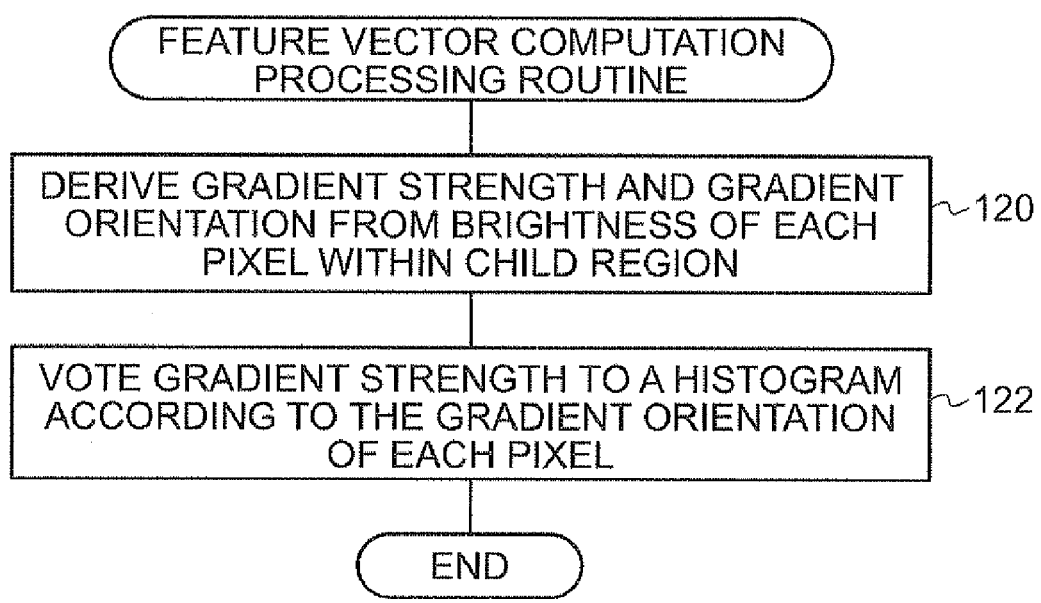
FIG. 11 is a flow chart showing contents of a feature vector computation processing routine in a computer of a target object discrimination apparatus according to the first exemplary embodiment of the present invention.

Step 106 is realized by executing the feature vector computation processing routine shown in FIG. 11 for each of the child regions of all of the parent regions.

First, in step 120, the gradient strength and the gradient orientation is derived for each pixel based on the brightness value of each pixel in the child region subject to processing. Then, at step 122, a gradient histogram is computed by voting the gradient strength derived for each of the pixels according to the gradient orientation of that pixel. A feature vector expressing the gradient histogram is generated for the child region subject to processing. The feature vector computation processing routine is then ended.

Figure 12:
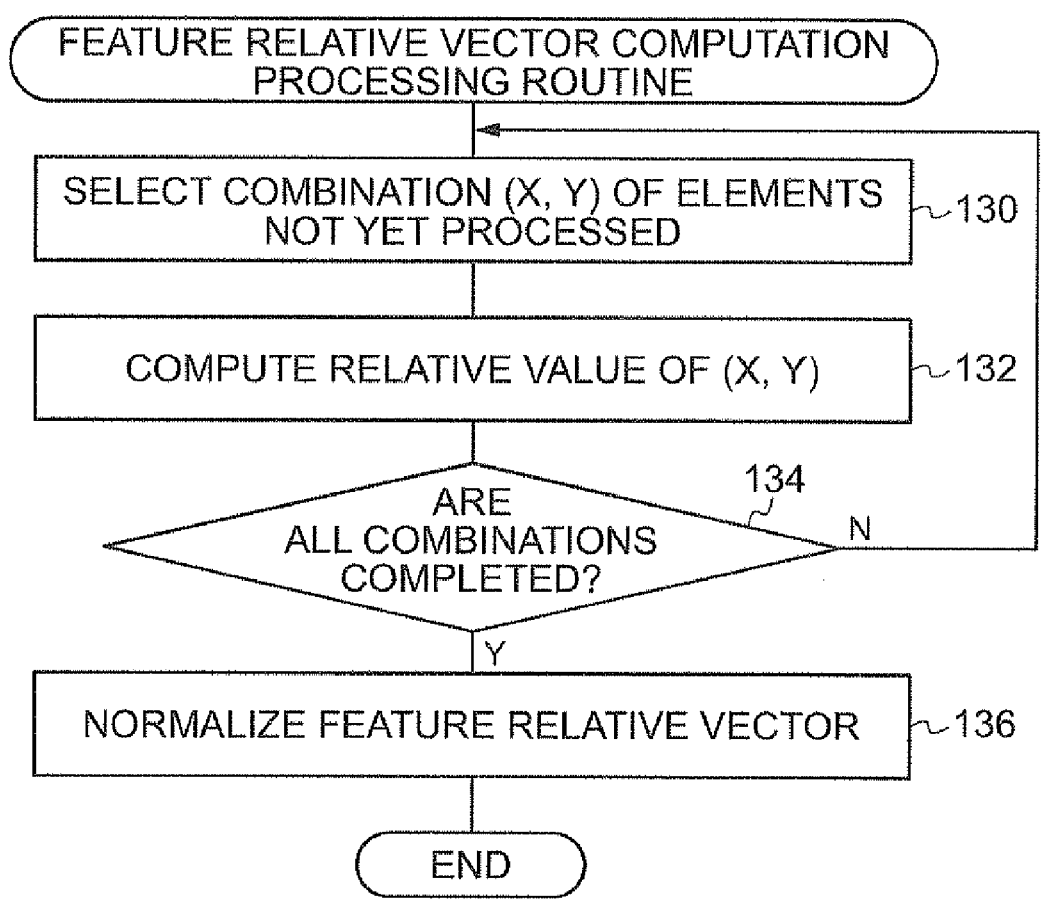
FIG. 12 is a flow chart showing contents of a feature relative vector computation processing routine in a computer of a target object discrimination apparatus according to the first exemplary embodiment of the present invention.

Step 108 is realized by executing the feature relative vector computation processing routine shown in FIG. 12 for each of the parent regions.

First, at step 130, from combination of elements of all of the feature vectors generated for all of the child regions belonging to the parent region subject to processing, a combination of X, Y coordinates (X, Y) not yet processed is selected, and at step 132, a relative value is computed based on the combination of elements (X, Y) selected at step 130.

Then, at step 134, determination is made as to whether or not the processing of step 132 has been performed for all of the combinations of elements of feature vectors generated for all of the child regions belonging to the parent region subject to processing. If there is a combination of elements not yet processed, processing returns to step 130, and the combination of elements not yet processed is selected. However, if processing has been completed for all of the combinations of elements of the feature vectors, then at step 136, the relative values computed at step 132 are arrayed, and a feature relative vector is generated, and the feature relative vector is normalized. The feature relative vector computation processing routine is then ended.

Next, explanation follows regarding the result of pedestrian image discrimination tests. Using as the discrimination-subject window images extracted from the captured images in which a pedestrian is captured, discrimination was made using the SVM discriminator as to whether or not the image is one in which a pedestrian appears. As explained in the above exemplary embodiment, feature relative vectors expressing the respective relative values were computed using the minimum value function, and discrimination performed with the SVM. As a comparative example, discrimination was performed with the SVM using a conventional brightness Histogram of Oriented Gradients (HOG) as the feature vectors.

Figure 13:
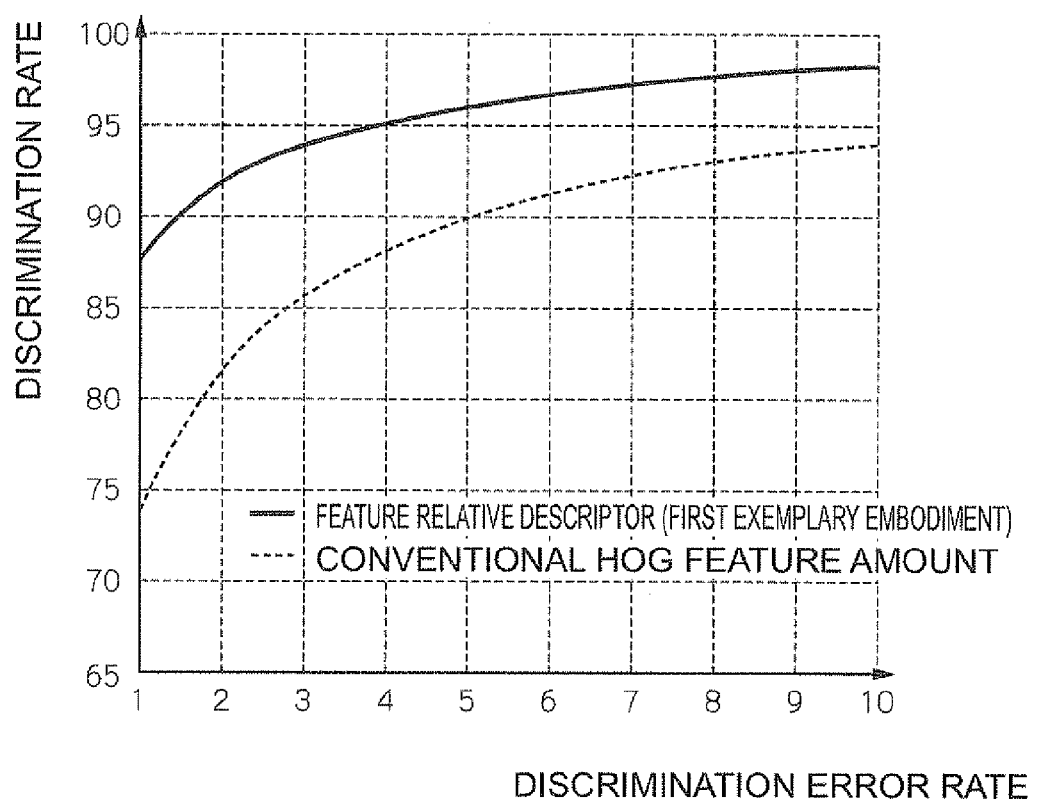
FIG. 13 is a graph showing results of pedestrian image discrimination tests.

As shown in FIG. 13, it can be seen that discrimination ability was raised in cases of discrimination employing the feature relative vector of the present exemplary embodiment, in comparison to cases of discrimination employing the conventional brightness Histogram of Oriented Gradients features.

As explained above, localized high order features can be extracted according to the target object discrimination apparatus according to the first exemplary embodiment, by employing a feature relative vector expressing relative values computed from each combination of elements across feature vectors and within feature vectors for each child region. In addition, high precision discrimination can be made as to whether or not the discrimination-subject window image is an image in which a pedestrian appears.

The feature relative vector, in which the brightness gradient features of an image are employed, may be thought of as being a feature amount of a conventional brightness Histogram of Oriented Gradients feature that has been raised to a higher-order. A conventional brightness Histogram of Oriented Gradients feature is one in which Histogram of Oriented Gradients of all of the child regions of the parent region are simply arrayed. In contrast thereto, in the present exemplary embodiment, the discrimination ability can be raised by employing feature relative vectors in which even higher order information is captured from the Histogram of Oriented Gradients for the child regions.

Next, explanation follows regarding a second exemplary embodiment. Note that since the configuration of the target object discrimination apparatus according to the second exemplary embodiment is similar to that of the first exemplary embodiment, the same reference numerals are appended and further explanation is omitted.

The second exemplary embodiment differs from the first exemplary embodiment in the point that a feature vector expressing the gradient histogram for the parent region is computed, and in the point that image discrimination is performed employing a single feature relative vector as the image feature for the image overall.

In the second exemplary embodiment, the window image obtained by the window image extraction section 21 is equally partitioned into plural parent regions by the region partitioning section 22.

The feature vector computation section 24 computes the gradient strength and gradient orientation of each of the pixels for the respective partitioned parent regions. The feature vector computation section 24 computes a gradient histogram for a particular parent region based on the gradient strength and gradient orientation of each pixel computed for this parent region.

The feature relative vector computation section 26 assembles feature vectors (Histogram of Oriented Gradients) computed for all of the parent regions, and makes respective combinations of all the elements of the feature vectors, and computes relative values for each combination of elements. The feature relative vector computation section 26 arrays the computed relative values and generates a feature relative vector.

The training model, derived in advance by the training processing described below, is stored in the training model storage section 28.

First, plural pedestrian images extracted with a clipping window of portions in which an image of a pedestrian is captured, and plural non-pedestrian images extracted with a clipping window of portions in which an image of a pedestrian is not captured, are prepared in advance. Then the above feature relative vector is computed for each of the plural pedestrian images and the plural non-pedestrian images.

Then, using the derived feature relative vector for each of the images as training data, training processing is performed employing instructor labels applied according to whether each of the images is a pedestrian image or a non-pedestrian image, an SVM model is derived as a training model and stored in the training model storage section 28.

The discrimination section 30 uses a known SVM discriminator and, based on the training model stored in the training model storage section 28 and the feature relative vector computed by the feature relative vector computation section 26, discriminates whether or not the discrimination-subject window image is an image in which a pedestrian is captured. The discrimination section 30 displays the discrimination result on the display device 16.

Next, explanation follows regarding a discrimination processing routine in the second exemplary embodiment.

First, a window image extracted from a captured image from the image capture device 12 is set as the discrimination subject, and the discrimination-subject window image is equally partitioned into plural parent regions.

Next, in the feature vector computation processing routine shown in FIG. 11, by switching the child region read in the parent region, and executing for each of the partitioned parent regions, the feature vector expressing the gradient histograms for each of the parent regions is computed. Then, based on the feature vector computed for each of the parent regions, and the feature relative vector is generated by computing relative values for each of the combinations of elements for all of the feature vectors.

Then, based on the generated feature relative vector, discrimination is made as to whether or not the discrimination-subject window image is a pedestrian image in which a pedestrian appears, by employing the training model derived in advance and the SVM discriminator, and the discrimination result is displayed on the display device 16. The discrimination routine is then ended.

As explained above, according to the target object discrimination apparatus of the second exemplary embodiment, localized high-order features can be extracted by employing the feature relative vector expressing the relative values computed for each of the respective combinations of elements across feature vectors and within feature vectors for each of the parent regions. High precision discrimination can also be made as to whether or not the discrimination-subject window image is an image in which a pedestrian appears.

Next, explanation follows regarding a third exemplary embodiment. Note that since the configuration of the target object discrimination apparatus according to the third exemplary embodiment is similar to that of the first exemplary embodiment, the same reference numerals are appended and further explanation is omitted.

The third exemplary embodiment differs from the first exemplary embodiment in the point that RGB histograms are generated as the feature vectors, from color components of each pixel.

In the target object discrimination apparatus according to the third exemplary embodiment, each density value for RGB of each pixel is computed for each of the partitioned child regions using the feature vector computation section 24. The feature vector computation section 24 computes a histogram of each density value of RGB for the child region (referred to below as RGB histograms) based on each density value of RGB of each pixel computed for each child region. For example, for RGB respectively, a range of density values from 0 to 255 is partitioned into 8 gradations, and a histogram of the 8 gradations is computed for each of R, G and B. During histogram voting, RGB histograms are computed by voting each of the RGB density values held by each pixel into the corresponding RGB gradation.

As described above, for each of the parent regions, RGB histograms are computed for each of the child regions belonging to the particular parent region, and feature vectors expressing the RGB histograms are generated for each of the child regions.

Note that since other parts of the configuration and operation of the target object discrimination apparatus according to the third exemplary embodiment are similar to those of the first exemplary embodiment, further explanation thereof is omitted.

Next, explanation follows regarding a fourth exemplary embodiment. Note that since the configuration of the target object discrimination apparatus according to the fourth exemplary embodiment is similar to that of the first exemplary embodiment, the same reference numerals are appended and further explanation is omitted.

The fourth exemplary embodiment differs from the first exemplary embodiment in the point that a texture histogram is generated for each of the child regions as the feature vector, from texture data of each pixel.

In the target object discrimination apparatus according to the fourth exemplary embodiment, the feature vector computation section 24 computes texture data for each pixel (such as, for example, texture intensity) for each of the partitioned child regions. The feature vector computation section 24 computes a histogram of texture data (referred to below as texture histogram) for a child region based on the computed texture data of each pixel for the particular child region. For example, texture data may be categorized, and a histogram computed for each category of texture data. During voting of the histogram, the texture histogram is computed by voting into the category corresponding to the texture data held by each pixel.

As described above, for each of the parent regions, a texture histogram is computed for each of the child regions belonging to that parent region, and a feature vector expressing the texture histograms is generated for each of the child regions.

Since other parts of the configuration and operation of the target object discrimination apparatus according to the fourth exemplary embodiment are similar to those of the first exemplary embodiment, further explanation thereof is omitted.

Note that while explanation has been given above in the first exemplary embodiment to the fourth exemplary embodiment of cases in which the minimum value or the harmonic mean value is computed as the relative value of a combination of elements, there is no limitation thereto. Configuration may be made in which other functions are applied to the combinations of elements, and the relative values computed.

Furthermore, while explanation has been given of cases in which discrimination processing for an image is performed by employing a SVM discriminator, there is no limitation thereto. Configuration may be made in which another known discrimination method (such as, for example, a nearest neighbor classification, tinier discrimination or the like) is employed, so as to perform image discrimination processing.

Furthermore, while explanation has been given of cases in which relative values are computed for all the combinations of elements of feature vectors, and a feature relative vector generated, there is no limitation thereto. Configuration may be made in which relative values are computed for combinations of a portion of the elements of the feature vectors, and the feature relative vector generated therefrom. For example, configuration may be made such that relative values are computed for only combinations, which are important for discrimination processing, of elements of feature vectors, such that the feature relative vector is generated therefrom.

Furthermore, while explanation has been given of cases in which the present invention is applied to a target object discrimination apparatus to discriminate whether or not an image is one in which a pedestrian is captured as the discrimination target object, there is no limitation thereto. The present invention may be applied to a target object detection apparatus that detects a region in which a pedestrian appears as a detection target object. For example, a window image discriminated as being a region in which a pedestrian appears may be detected and output as region in which a pedestrian appears.

Furthermore, explanation has been given of cases in which a captured image is acquired from an image capture device and window images extracted therefrom, however there is no limitation thereto. Configuration may be made, for example, in which image data is read from a hard disk device, and window images extracted from the image data that has been read.

Furthermore, while explanation has been given of cases of extracting window images using clipping windows of various sizes, there is no limitation thereto. Configuration may be made, for example, such that window images are extracted by scanning a clipping window of fixed size. In such cases, the overall image for input may be enlarged or contracted, window images extracted from the respective enlarged images or contracted images using a clipping window of fixed size, and subjected to discrimination.

Furthermore, while explanation has been given of cases in which the partitioning of the partitioned parent regions and child regions is made such that there is no overlap between adjacent regions, there is no limitation thereto. Configuration may be made, for example, such that partitioning of the parent regions and child regions is by a partitioning method with overlap between adjacent regions. Configuration may also be made in which the parent regions and the child regions are partitioned by a non-equal partitioning method.

Furthermore, while explanation has been given of cases in which the feature vector expresses a histogram of image feature amounts, there is no limitation thereto. Configuration may be made, for example, in which an image feature amount is extracted from each pixel of the child regions, obtaining and a feature vector generated with the physical quantities for respective different image feature amounts obtained from image feature amounts extracted as elements of the feature vector.

Furthermore, while explanation has been given of cases in which the discrimination target object is a person, there is no limitation thereto, and an object other than a person may be employed as the discrimination target object.

While in the specification of the present application explanation has been given of exemplary embodiments in which a program is installed in advance there is no limitation thereto, and, for example, it is possible to store such a program on a storage medium, such as a CDROM or the like, and supply the program therefrom.

What is claimed is:

1. An image processing apparatus comprising:
a feature vector computation unit that computes a feature vector with elements of a physical quantity against respective different feature amounts, for each of a plurality of partitioned regions partitioned from an image subject to processing;
a feature relative vector computation unit that computes a feature relative vector expressing computation values computed from respective combinations of the same or different elements across feature vectors computed by the feature vector computation unit for each partitioned region, and computation values computed from respective combinations of different elements within one of the feature vectors; and
an image processing unit that, based on the feature relative vector computed by the feature relative vector computation unit, discriminates whether or not the image subject to processing is an image in which a processing target object appears, or detects a region from the image subject to processing in which the processing target object appears.

2. The image processing apparatus of claim 1, wherein:
the feature vector computation unit computes the feature vector for each of a plurality of child regions partitioned from a plurality of parent regions partitioned from the image subject to processing;
the feature relative vector computation unit computes for each of the respective parent regions a feature relative vector expressing computation values computed from respective combinations of different elements across feature vectors computed for each child region of the parent region by the feature vector computation unit, and computation values computed from respective combinations of different elements within one of the feature vectors; and,
the image processing unit, based on the feature relative vector computed for each of the parent regions by the feature relative vector computation unit, discriminates whether or not the image subject to processing is an image in which the processing target object appears, or detects a region from the image subject to processing in which the processing target object appears.

3. The image processing apparatus of claim 1, wherein the feature vector computation unit extracts a feature amount for each pixel of the partitioned regions, and computes as the feature vector for the partitioned regions a feature histogram with elements of occurrence frequency against respective different feature amounts.

4. The image processing apparatus of claim 3, wherein the feature vector computation unit computes gradient orientation and gradient strength for each pixel of the partitioned regions, and, based on the gradient orientation and gradient strength of each pixel computes as the feature vector a Histogram of Oriented Gradients for the partitioned region with elements of voted values of gradient strength against each different gradient orientation.

5. The image processing apparatus of claim 3, wherein the feature vector computation unit computes each density value of RGB for each pixel of the partitioned regions, and based on each density value of RGB for each pixel computes as the feature vector RGB histograms for the partitioned region with elements of voted values against each gradation of each density value of RGB.

6. The image forming apparatus of claim 3, wherein the feature vector computation unit computes texture data for each pixel of the partitioned regions, and, based on the texture data of each pixel, computes as the feature vector a texture histogram for the partitioned region with elements of voted values against each classification of texture data.

7. The image forming apparatus of claim 2, wherein the feature vector computation unit extracts feature amounts, for each pixel of the partitioned regions, and computes as the feature vector a feature histogram for the partitioned region with elements of occurrence frequency against each different feature amount.

8. The image forming apparatus of claim 7, wherein the feature vector computation unit computes gradient orientation and gradient strength for each pixel of the partitioned regions, and, computes as the feature vector a Histogram of Oriented Gradients for the partitioned region with elements of voted values of gradient strength against respective different gradient orientations.

9. The image processing apparatus of claim 7, wherein the feature vector computation unit computes each density value of RGB for each pixel of the partitioned regions, and based on each density value of RGB for each pixel, computes as the feature vector RGB histograms for the partitioned region with elements of voted values against each gradation of each density value of RGB.

10. The image forming apparatus of claim 7, wherein the feature vector computation unit computes texture data for each pixel of the partitioned regions, and, based on the texture data of each pixel, computes as the feature vector a texture histogram for the partitioned region with elements of voted values against each category of texture data.

11. The image forming apparatus of claim 1, wherein the feature relative vector computation unit computes as the computed value a minimum value or a harmonic mean value of a combination of the elements.

12. A non-transitory computer readable medium storing a program causing a computer to execute a process for image processing, the process comprising:
  computing a feature vector with elements of a physical quantity against respective different feature amounts, for each of a plurality of partitioned regions partitioned from an image subject to processing;
  computing a feature relative vector expressing computation values computed from respective combinations of the same or different elements across feature vectors computed for each partitioned region, and computation values computed from respective combinations of different elements within one of the feature vectors; and,
  based on the computed feature relative vector, discriminating whether or not the image subject to processing is an image in which a processing target object appears, or detecting a region from the image subject to processing in which the processing target object appears.

13. An image processing method comprising:
  computing a feature vector with elements of a physical quantity against respective different feature amounts, for each of a plurality of partitioned regions partitioned from an image subject to processing;
  computing a feature relative vector expressing computation values computed from respective combinations of the same or different elements across feature vectors computed for each partitioned region, and computation values computed from respective combinations of different elements within one of the feature vectors; and,
  based on the computed feature relative vector, discriminating whether or not the image subject to processing is an image in which a processing target object appears, or detecting a region from the image subject to processing in which the processing target object appears.

* * * * *